United States Patent [19]

Nakatani

[11] Patent Number: 4,929,973
[45] Date of Patent: May 29, 1990

[54] PANHEAD WITH QUICK RELEASE SHOE

[75] Inventor: Kouichiro Nakatani, Tokyo, Japan

[73] Assignee: Velbon International Corporation, Torrance, Calif.

[21] Appl. No.: 202,403

[22] Filed: Jun. 6, 1988

[30] Foreign Application Priority Data

Aug. 7, 1987 [JP] Japan ................... 62-197344

[51] Int. Cl.⁵ .............................. G03B 17/00
[52] U.S. Cl. ..................... 354/293; 248/187
[58] Field of Search ............. 354/81, 82, 293, 295; 248/176, 177, 187

[56] References Cited

U.S. PATENT DOCUMENTS 3,356,325 12/1967 Schnase .................. 248/187
4,525,052 6/1985 Kosugi et al. ............ 354/293

FOREIGN PATENT DOCUMENTS 60-133294 9/1985 Japan .
60-40952 12/1985 Japan .

Primary Examiner—Brian W. Brown
Attorney, Agent, or Firm—Beehler & Pavitt

[57] ABSTRACT

An improved panhead for a tripod and the like includes a tray and a releasable shoe. A quick release mechanism is provided to release the shoe from the tray. To prevent separation of the shoe from the tray, with the release mechanism in the release position, the tray is provided with side walls and a bottom surface and a rear wall, the latter inclined, the shoe including an inclined rear wall. The side walls of the tray are provided with flanges which are spaced from the bottom surface and which cooperate with the shoe to retain the shoe on the tray with the release of the shoe. In this way, even if released, the shoe will not separate as the panhead is tilted on any of its axes.

15 Claims, 1 Drawing Sheet

PANHEAD WITH QUICK RELEASE SHOE

BACKGROUND OF THE INVENTION

1. Field of the Invention

The present invention pertains to the field of panheads of the type used to support photograhic or other imaging equipment on tripods or the like, and more particularly relate to an improved panhead of the type having a releasable shoe which is attached to a camera or the like to allow quick mounting or release of the one shoe and camera to the panhead.

2. State of the Prior Art

It is known to provide a panhead with a detachable base on which a camera or the like may be secured so as to be quickly and easily detachable from the panhead, as is for example disclosed in Japanese Patent Office Bulletin No. 133294, 1985. The panhead disclosed in the aforementioned official bulletin includes a panning head mounted on a base so as to allow for tilting movement of the head about at least one axis relative to the base. A rectangular receptacle is defined in the top of the panning head which is closed on three sides and open along a fourth side. A shoe element which is attachable to the underside of a photographic camera or other equipment to be supported on the panhead fits into the panhead receptacle and can be secured therein by means of a pivotable shoe locking lever mounted on the open side of the receptacle and by means of which the shoe may be selectively secured or released, thereby allowing for quick attachment or release of the camera or the like to the panhead.

A serious shortcoming of this prior art panhead resides in the possibility of accidental release of the locking lever in which case the shoe is free to drop from the panning head together with whatever equipment is carried on the shoe, raising the possibility not only of costly damage to the equipment but also of bodily injury to persons in the immediate vicinity.

One attempt at overcoming this difficulty is described in Japanese Patent Office Bulletin No. 40952, 1985 wherein a spring loaded locking lever is pivoted on the panhead and prevents accidental release of the shoe from the panhead. However, this locking system requires additional component parts and complicates construction and assembly of the panhead, increasing its cost and complicating operation of the panhead.

A continuing need therefore exists for a panhead with a quick release shoe in which the apparatus supported on the shoe cannot fall off even if the shoe release lever is accidentally released.

SUMMARY OF THE INVENTION

The invention is an improved panhead of the type including a shoe carrier tray mounted for movement about one or more axes relative to a panhead base, a shoe attachable to a device such as a camera, and a shoe locking lever movable between a locked position and a release position for releasably locking the shoe to the tray. The improvement comprises retaining portions integral with the carrier tray for holding the shoe against separation from the tray by force of gravity alone notwithstanding tilting of said tray about any tilt axis with the shoe locking lever in the release position. The integral shoe retaining elements are configured however to allow deliberate manual removal of the shoe from the panhead tray while the locking lever is in its release position. A shoe receiving receptacle is defined in the tray between three tray walls, including an end wall and two side walls arranged in a U configuration and open on a fourth side. The shoe locking lever is pivoted to the tray on the open side of the receptacle and even in its release position cooperates with the integral shoe retaining elements to keep the shoe from falling out of the receptacle unless deliberately removed.

The shoe retaining portions of the tray include a pair of retaining flanges projecting from the side walls into the receptacle. A pair of lateral flanges integral to the shoe fit under the tray's retaining flanges which hold down the shoe on the side of the end wall of the receptacle. The retaining flanges on the tray have slanted undersurfaces overlying the shoe's lateral flanges which allow a limited twisting of the shoe out of the receptacle, but also keep the shoe from twisting completely out of the receptacle when lifted at the opposite, open end of the tray. As a result extraction of the shoe from the tray receptacle requires a combination of twisting and pulling motions which cannot occur by force of gravity alone regardless of the degree of tilt of the panhead. The necessary twisting and pulling motions are in opposite directions so that for any possible tilt of the panhead only one of these motions can result from gravitational force which therefore cannot alone separate the shoe from the tray.

The integral retaining elements may further include a slanted inner surface on the end wall opposite the locking lever, the inner surface defining an undercut in the end wall for receiving a slanted edge of the shoe.

The locking lever is spring loaded towards its locked position and a detent pin means spring is loaded towards a lever stopping position for detaining the lever in the release position, the detent pin being urged away from the lever stopping position upon placement of the shoe in the receptacle thereby to cause the locking lever to snap to its shoe locking position under the aforementioned spring loading.

These and other features of the present invention will be better understood from the following detailed description in light of the accompanying drawings.

DETAILED DESCRIPTION OF THE PREFERRED EMBODIMENT

Figure 1:
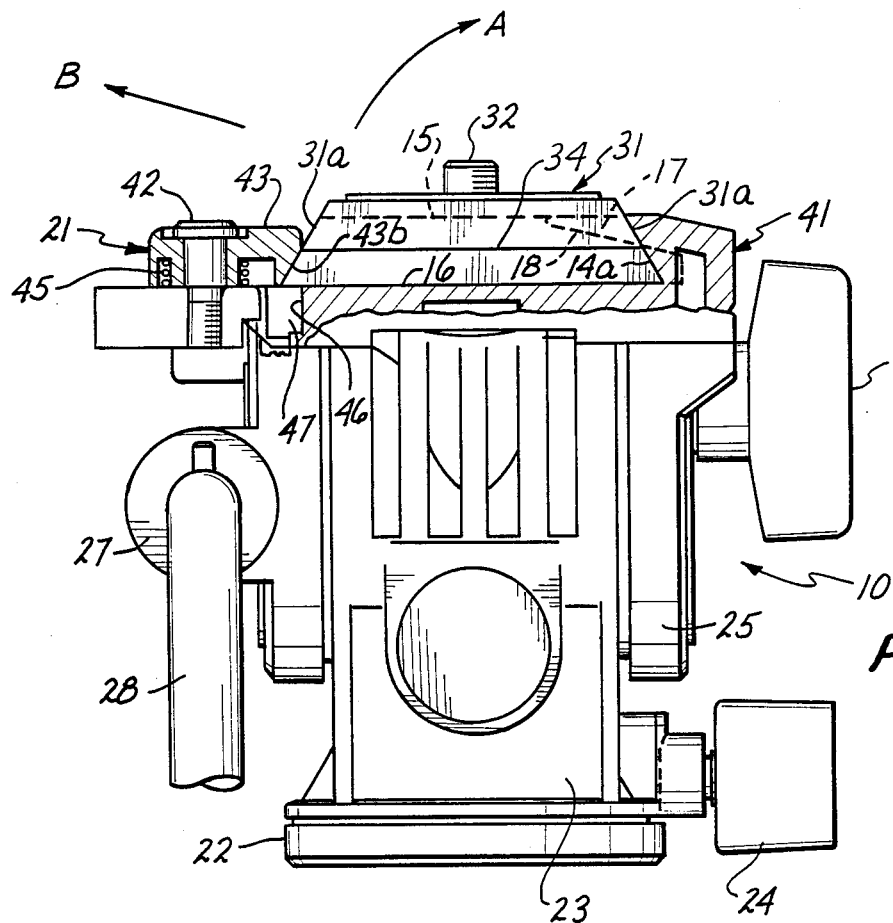
FIG. 1 is a side elevational view partly in section of the improved panhead.

The improved panhead 10 of this invention has a carrier tray 41 in which a receptacle 12 is defined between three tray walls including an end wall 14 intermediate two parallel side walls 15, and having a bottom surface 16. A coupling shoe 31 on which devices such as a camera, etc., can be removably secured, fits closely between the tray walls in the receptacle 12 and a locking lever 21 located on the fourth, open side of the receptacle 12 opposite the end wall 14. The locking lever 21 is pivotable between a shoe locking position (shown in FIG. 1) and a shoe releasing position (shown in FIG. 2). A pair of shoe retaining flanges 17 project horizontally into the receptacle 12, one flange from each side wall 15 adjacently to the end wall 14 and spaced upwardly from the bottom 16. The flanges 17 cooperate with laterally projecting shoe flanges 34 on the shoe 31 so as to guide and restrict the movement of the shoe 31 into and out of the receptacle 12 along a particular path.

A camera or the like is mounted on the panhead 10 by first removing the shoe 31 from the panhead 10 by lifting the shoe on the side adjacent the locking lever 21 and then withdrawing the shoe flanges 34 along an upwardly rising plane away from the retaining flanges 17. The camera or other device is then attached to the shoe 31 while the latter is separated from the panhead 10. The shoe 31 is then reinserted into the receptacle 12 in the panhead 10 by reversing the aforementioned shoe removal sequence.

The panhead 10 includes a base 22 with a threaded vertical hole in the center of its underside into which is received the pan screw of a tripod (not illustrated), to fix the base 22 to the tripod. A panning stand 23 turns freely in a horizontal plane about a vertical axis centered on the aforementioned pan screw. A set screw 24 is threaded into the stand 23 and may be tightened against the base 22 for locking the stand 23 against rotation on the base 22, or may be released to allow free relative movement of the stand 23. A tilting stand 25 is supported on a horizontal tilt axis (not illustrated) on the upper end of the panning stand 23, and can be swiveled back and forth through a vertical tilt arc. A set screw 6 is threaded in the tilting stand 25 on the right side of the tilting stand in FIG. 1 and may be tightened against the panning stand 23 so as to lock the tilting stand 25 against movement relative to the panning stand 23. On the left side of the tilting stand 25 in FIG. 1 there is a holder 27 for a tubular handle 28 which extends generally perpendicular to the plane of the drawing. The handle 28 can be detached from the holder 27 and may be inserted into the holder 27 either from the front or the rear.

A shoe carrier tray 41 is fixed by screws (not shown) to the upper end of the tilting stand 25, and defines the shoe receptacle 12 which is open on the left side in FIG. 1. As earlier described the shoe receiving receptacle 12 is defined between two side walls 15 and an end wall 14. The inner surface 14a of the end wall 14 has a reverse taper and slants inwardly into the wall 14 (outwardly from the receptacle 12) in a downward direction, defining an undercut in the end wall 14. A pair of flanges 17 are located one at each intersection of the end wall 14 with each of the side walls 15. The flanges 17 are located at the upper edge of the side walls 15, spaced from the tray floor 16, and project horizontally into the receptacle 12. The locking lever 21 is pivoted to the tray 41 about a vertical axis defined by pivot screw 42. The locking lever 21 includes a semicircular cam portion 43 and an actuating handle 44. The cam portion 43 has a flat side surface 43a which faces into the receptacle 12 in the release position of the lever 21, and an arcuate camming edge 43b which engages one side 31a of the shoe so as to positively urge the opposite side 31a of the shoe into the undercut of the end wall 14 and against the slanted wall surface 14a. The camming edge is slanted in an inverted frustoconical manner, diminishing in radius in a downward direction along the screw 42 so as to mate against the opposite slant of the shoe edge 31a. This slanted camming surface 43b extends circumferentially from approximately the actuating lever 44 to the flat side surface 43a. The radial distance from the vertical axle 42 to the slanted surface 43b increases in a circumferential direction from the flat side surface 43a toward the lever 44, i.e., the circular camming edge surface 43b is mounted eccentrically to the vertical pivot 42 so as to urge the camming edge 43b against the shoe 31 when the lever 44 is pivoted clockwise in FIG. 2 to its shoe locking position. The locking lever 44 is normally urged clockwise in FIG. 2 towards its locking position by biasing spring 45, seen in FIG. 1. A detent pin 47 is movable up and down in a hole 46 in the tray bottom 16 and is biased upwardly by an underlying spring 28. The detent pin is located so that it is free to protrude above the tray floor 16 when the locking lever 21 is in the release position of FIG. 2 and thus holds the lever in its release position against the bias of spring 45. The detent pin 47 is however depressed into its hole under the shoe 31 when the shoe is inserted into the receptacle 12, allowing the lever to snap to a shoe locking position where the camming edge 43b engages the shoe edge 31a sufficiently to retain the shoe in place. The lever 44 can then be made manually further pivoted clockwise for positive camming engagement against the shoe 31.

Figure 2:
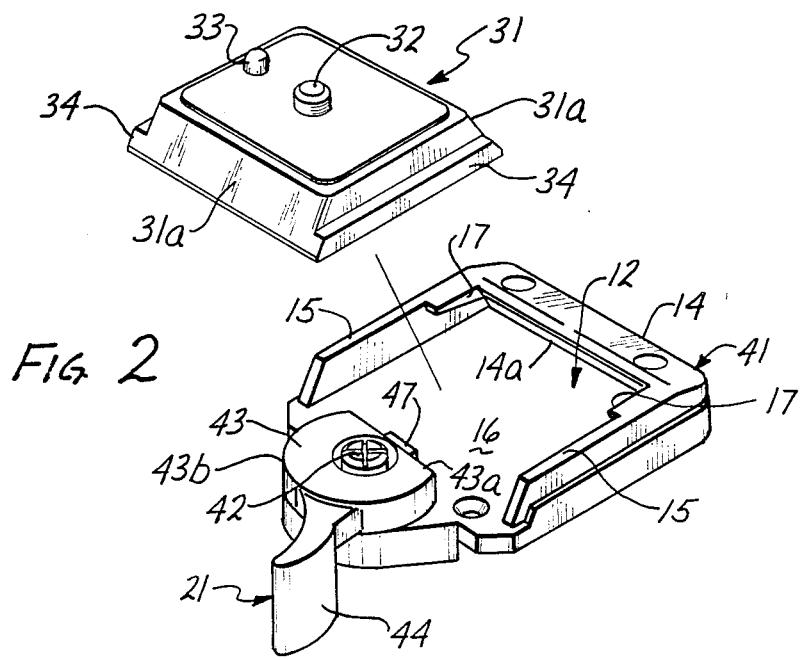
FIG. 2 is a perspective view of the quick release shoe separated from the shoe carrier tray of the panhead.

The shoe 31 is a generally rectangular place insertable into the receptacle 12 of the tray 41 in FIG. 2. A screw 32 is freely rotatable through the shoe for tightening a camera to the top surface of the shoe 31. The screw head (not illustrated) of screw 32 is underneath the shoe 31. An alignment pin 33 on the shoe 31 serves to hold against rotation a camera mounted on the shoe. The shoe 31 has two sides 31a which are inclined surfaces sloping in frusto-pyramidal fashion upwardly and towards each other. The shoe is inserted in the receptacle 12 with the sides 31a oriented between the end wall 14 and lever 21 of the panhead tray 41 as shown in FIG. 1, the inclination of the shoe surfaces 31a mating with the inclined surfaces 14a and 43b of the end wall 14 and locking lever 21 respectively. The camming edge 43b of the locking lever 21 acts against one side 31a of the shoe to hold the opposite side 31a within the undercut defined between the inclined surface 14a and tray floor 16 when the locking lever 21 is rotated clockwise in FIG. 2 to a shoe locking position, thereby securing the shoe 31 to the panhead 10. The reverse tapered end surface 14a and the retaining flanges 17 cooperate with the slanted edge 31a and the lateral projections 34 on the shoe 31 to securely retain the shoe within the receptacle 12 on the panhead tray 41 even if the lever 21 is accidentally rotated towards its shoe releasing position illustrated in FIG. 2, and even if the panhead tray 41 is tilted by as much as 90 degrees to the horizontal about its horizontal tilt axis, i.e, where the tray bottom 16 becomes vertical to the ground.

Each retaining flange 17 has an under surface 18 which slants upwardly towards the open side of the receptacle 12, i.e., the side where the locking lever 21 is mounted, to allow only limited twisting of the shoe in the receptacle when the side 31a adjacent to the locking lever is lifted. The flanges 17 are configured to allow the side 31a of the shoe adjacent to the lever 21 to be lifted sufficiently as indicated by arrow A in FIG. 1 so as to clear the top of lever 21, and then to allow the shoe to be pulled away from the flanges 17 along the plane and direction of the shoe lateral flanges 34 indicated by arrow B in the same Figure. Both the initial twisting movement A and subsequent pulling movement B are required to extract the shoe 31 from the receptacle 12. These two required movements are in opposite directions to each other so that for any given tilt of the panhead, gravity acting alone cannot cause the shoe to fall out of the receptacle 12. In the case where the tray 41 is tilted with the lever 44 up relative to the end wall 14, the edge 31a of the shoe 31 adjacent to the lever 21 will tend to lift away from the tray bottom 16 in a released condition of the locking lever 21 and steep inclination of the tray 41, but the shoe 31 will nevertheless be held within the receptacle 12 by the retaining flanges 17 overlying the lateral projections 34 of the shoe 31 after a limited lifting of the shoe from the tray bottom 16 on its elevated side. The shoe 31 will likewise be held within the panhead tray receptacle 12 if the panhead tray 41 is tilted in the opposite direction i.e. with the lever 21 down relative to the side 14 of the tray and with the lever 21 in its open position. This is because the edge 31a of the shoe 31 adjacent to the lever 21 will lie against side surface 43a of the locking lever 21 which will keep the shoe from sliding any substantial distance away from the surface 14a which together with the retaining flanges 17 will hold down the elevated side of the shoe 31 against the tray bottom 16 and thus keep the shoe 31 along with any equipment secured to the shoe from falling away form the panhead tray 41. Thus, irrespective of which side of the panhead tray 41 is inclined downwardly and regardless of the angle of inclination of the tray 41, the shoe 31 and any equipment attached thereto cannot separate from the panhead tray 41 by force of gravity alone regardless of the attitude of the tray 41 even with the locking lever 21 is open position. The flanges will also hold down the shoe with the locking lever released for tray tilting on either side wall 15.

Since the panhead tray 41 is formed integrally with the tray walls 14, 15 and retaining flanges 17, the parts count and complexity of the panhead is not increased, construction and assembly of the panhead remains simple, and production costs are kept low. Further, no additional moving parts or operating levers are added by the present invention as was the case in the referenced prior art Japanese Official Bulletin No. 46952, 1985, thus maximizing reliability and durability of the improved panhead. In addition, it will be understood that the shape of the panhead tray 41 can be modified various ways without departing from the present invention, in particular as by providing portions integral with the tray 41 for covering or protecting the lever 21 or otherwise reinforcing portions of the panhead tray 41.

While a particular embodiment of the invention has been shown and illustrated for purposes of clarity and example only, it must be understood that many changes, modifications and substitutions to the illustrated embodiment will become apparent to those possessed of ordinary skill in the art without thereby departing from the spirit and scope of the invention which is defined by the following claims.

I claim:

1. In a panhead of the type including a tray mounted for movement about one or more axes relative to a panhead base, a shoe attachable to a device such as a camera, and shoe locking means movable between the locked position and a release position for releasably locking said shoe to said tray, the improvement comprising:
   said tray including an interior wall and a pair of side walls which meet the interior wall and the bottom wall,
   retaining means on said side walls adjacent said interior wall of said tray,
   said shoe including means cooperating with said retaining mean on said tray for holding said shoe against separation from said tray by force of gravity alone notwithstanding tilting of said tray about any of said axes with said shoe locking means in said release position, and
   said shoe being manually disengageable from said retaining means with said shoe locking means in the release position.

2. The improvement of claim 1 wherein said retaining means include projecting portions integral with said panhead tray and extending from the interior wall and spaced from said bottom wall.

3. The improvement of claim 1 wherein said tray side walls define a shoe receiving recess and at least some of said retaining means are integral with said side walls,
   said shoe including at least one inclined wall, and
   said interior wall being inclined to mate with the inclined wall of said shoe.

4. The improvement of claim 1 wherein said shoe locking means is a camming lever pivoted to said tray, said side and interior walls enclosing said recess along three sides, said camming lever engaging said shoe on an open side of said recess, said lever holding said shoe against disengagement from said retaining means in said release position through the full range of movement of said tray about said one or more axes.

5. The improvement of claim 4 wherein said camming lever is spring loaded towards said locked position and further comprising detent pin means spring loaded towards a lever stopping position for detaining said lever in said release position, said detent pin being urged away from said lever stopping position upon placement of said shoe in said recess thereby to cause said locking lever to snap to said shoe locking position under said spring loading.

6. The improvement of claim 4, wherein said retaining means comprise a pair of integral retaining flanges extending horizontally into said recess from said side walls in spaced relationship to a recess bottom;
   said shoe having lateral projections on two parallel sides of the shoe, each of said projections dimensioned to fit between one said retaining flange and said recess bottom.

7. The improvement of claim 6 wherein said integral retaining means comprise a slanted inner surface on one of said side walls opposite said camming lever, said inner surface defining an undercut in said side wall, said shoe further having a side wall between said lateral projections slanted to mate into said undercut.

8. In a panhead of the type including a tray pivotable about a tilt axis relative to a panhead base, a shoe attachable to a device such as a camera, and a shoe locking lever on said tray movable between a locked position and a release position for releasably locking said shoe within a recess in said tray, the improvement comprising:
   said tray including spaced side walls and an interior wall forming a shoe receiving recess open opposite said interior wall,
   said shoe including side walls received by the side walls of said tray,
   first shoe retaining portions integral with said spaced side walls of said tray and engaging at least a portion of the side walls of said shoe,
   second shoe retaining portions integral with said shoe and cooperating with said first shoe retaining portions and said locking lever for holding said shoe against separation from said tray by force of gravity alone notwithstanding tilting of said tray about said axis with said shoe locking lever in said release position, and said first and second shoe retaining portions being manually disengageable for removing the shoe from said recess while said lever is in said release position.

9. The improvement of claim 8 wherein said tray is rectangular, said first and second shoe retaining portions are arranged on a side of said tray opposite said locking lever to allow separation of said shoe only by first lifting said shoe away from said tray on the side proximal to said lever and then disengaging said first and second shoe retaining portions.

10. The improvement of claim 9 wherein said recess is closed on three sides by side walls and said lever is on an open side of said recess, said first shoe retaining means comprising a slanted inner surface on a side wall opposite said lever, said inner surface defining an undercut in said side wall, and a pair of retaining flanges extending horizontally into said recess from said side walls in spaced relationship to a recess bottom;

said second shoe retaining means comprising lateral projections on two parallel sides of the shoe, each of said projections dimensioned to fit between one said retaining flanges and said recess bottom, said shoe further having a side wall between said lateral projections slanted to mate into said undercut, said lever preventing withdrawal of said second shoe retaining means way from said first shoe retaining means except by first lifting said shoe away from said recess bottom adjacently to said lever.

11. The improvement of claim 10 wherein said lever is spring loaded towards said locked position and further comprising detent pin means spring loaded towards a lever stopping position for detaining said lever in said release position, said detent pin being urged away from said lever stopping position upon placement of said shoe in said recess thereby to cause said locking lever to snap to said shoe locking position under said spring loading.

12. In a panhead of the type including a tray pivotable about a tilt axes axis relative to a panhead base, a shoe attachable to a device such as a camera, and a shoe locking lever on said tray movable between a locked position and a release position for releasably locking said shoe within a recess in said tray, the improvement comprising:

side walls closing said tray recess on three sides, said lever being pivoted to said tray on an open side of said recess, a slanted inner surface on a side wall opposite said lever defining an undercut in said side wall, and a pair of retaining flanges extending horizontally into said recess from said side walls adjacently to said slanted inner surface in upwardly spaced relationship to a recess bottom;

lateral projections on two parallel sides of the shoe, each of said projections dimensioned to fit between one said retaining flanges and said recess bottom, said shoe further having two opposite side surfaces between said lateral projections slanted for mating into said undercut, said lever having a slanted cam surface engageable with one of said slanted side surfaces for urging the other of said slanted side surfaces into said undercut thereby to secure the shoe to said tray in said locked position of the lever, said flanges cooperating with said lateral projections to keep said shoe from falling out of the tray recess by force of gravity alone notwithstanding tilting of said tray about said axis with said shoe locking lever in said release position.

13. The improvement of claim 12 wherein said flanges each have an undersurface slanted to allow limited twisting movement of said shoe relative to said tray, so as to allow subsequent withdrawal of the shoe from the tray, said twisting and subsequent withdrawal being in generally opposite directions.

14. In a panhead of the type including a tray mounted for movement about one or more axes relative to a panhead base, a shoe attachable to a device such as a camera, and shoe locking means movable between a locked position and a release position for releasably locking said shoe to said tray, the improvement comprising:

said tray including spaced side walls and a rear wall, said rear wall being inclined, said shoe including an inclined rear wall which mates with the inclined rear wall of said tray, retaining means integral with the side walls of said tray arranged and configured to allow limited twisting movement of said shoe relative to said tray, so as to allow subsequent withdrawal of the shoe from the tray, said twisting and subsequent withdrawal being in generally opposite directions thereby holding said shoe against separation from said tray by force of gravity alone notwithstanding tilting of said tray about any of said axes with said shoe locking means in said release position, and said shoe being manually disengageable from said retaining means.

15. A panhead for attachment to a tripod for detachable mounting to a device such as a camera, comprising a panhead body including a tray said tray including an interior side wall, a pair of spaced parallel side walls which join to the interior side wall, and a bottom wall, a detachably fitting shoe which may be inserted into the tray of the panhead body and to which a device such as a camera may be releasably attached, a shoe locking device mounted on said tray opposite the interior side wall of said shoe and operative in one position to lock the shoe to the tray and operative in another position to release the show form said tray, said tray including retaining projections extending laterally from the side walls thereof and located next to the interior side wall and spaced from the bottom wall, said retaining projections extending only along a portion of the side walls, and said shoe including means cooperating with said retaining projections to prevent release of the shoe from the tray in the released position of said locking device.

* * * * *